Sept. 16, 1952 F. G. BOUCHER 2,610,507
GRAVITY METER

Filed March 13, 1947 2 SHEETS—SHEET 1

Frank G. Boucher Inventor
By W. O. T Heilman Attorney

Sept. 16, 1952     F. G. BOUCHER     2,610,507
GRAVITY METER

Filed March 13, 1947     2 SHEETS—SHEET 2

Patented Sept. 16, 1952

2,610,507

UNITED STATES PATENT OFFICE 2,610,507

GRAVITY METER

Frank G. Boucher, Tulsa, Okla., assignor to Standard Oil Development Company, a corporation of Delaware Application March 13, 1947, Serial No. 734,500

4 Claims. (Cl. 73—382)

The present invention is directed to a gravity meter.

The principal object of the present invention is the provision of a gravity meter which can be used for surveying over much longer distances with reference to a single base station than has been heretofore possible.

An additional object of the present invention is the provision in a gravity meter of a simple device by which the range of gravity values measurable by a gravity meter is greatly increased.

Another object of the present invention is the provision in a gravity meter of a range increasing device operable from the exterior of the gravity meter.

A more specific object of the present invention is the provision in a gravity meter of a rider or a series of riders which can be manipulated from the exterior of a gravity meter to extend the range of gravity values measurable by the gravity meter.

Figure 1:
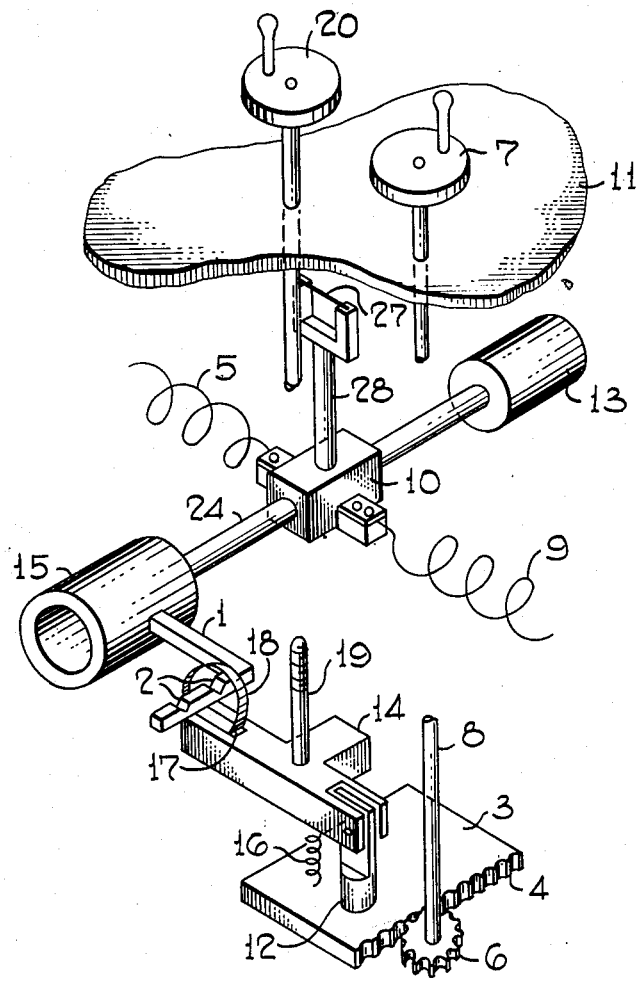
Figure 2:
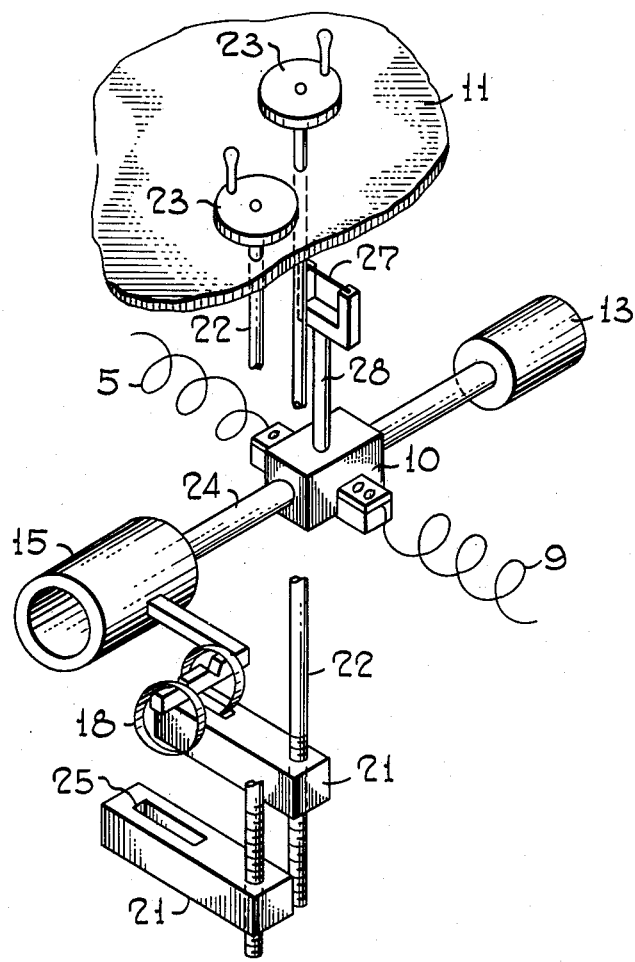

Further objects and advantages of the present invention will appear from the following detailed description of the accompanying drawing, in which:

Figure 1 is a schematic view in perspective of one type of gravity meter with one embodiment of the present invention adapted thereto; and Figure 2 is a similar view with a modified embodiment of the present invention adapted thereto.

Referring to the drawing it will be observed that the gravity responsive system illustrated therein is in essence that illustrated in U. S. Patent 2,327,697 granted August 24, 1943. For ease of description elements in the present drawing corresponding to elements in the patent drawing are given the same numeral. Briefly, this gravity responsive system includes a gravity responsive mass 13 carried by torsion springs 5 and 9. Arranged on the opposite side of the axes of the springs from the mass 13 is a barometric compensator 15. Mounted on the center of the cross member 10 is a post 28, carrying a filament 27, which is observed through an eyepiece in the top of the meter.

Referring to Figure 1 the adaptation of the present invention to the system shown involves the provision of an L-shaped rider arm 1, on the barometric compensator and extending laterally therefrom with the leg member of the L parallel to the longitudinal axis of the compensator. The leg member is provided with notches 2, of which two are shown, although any number may be employed.

Suitably supported by the frame of the meter is a sliding carriage 3, having on one of its edges a rack 4, with which is meshed a pinion 6, operated by a hand wheel 7, fixed to the shaft 8 of the pinion which extends through the top 11 of the meter.

On the carriage 3 is mounted an upright post 12, at the top of which is pivoted rider support arm 14. A spring 16 normally forces the arm 14 upwardly away from the carriage. On the upper face of the rider support arm near its free end is a groove 17, in which rests a rider 18, encircling the leg of the L-shaped rider arm 1. A threaded rod 19, carrying at its outer end an operating hand wheel 20, extends downwardly through the top 11 of the meter with its free end resting on the upper surface of the arm 14. By suitably manipulating the hand wheel 20, the rider 18 can be dropped into one of the notches 2 on the leg of the L-shaped rider arm 1. By suitably manipulating the hand wheel 7, the notch into which the rider is dropped may be selected. It will be understood that the hand wheel 7 will be suitably graduated and correlated with a reference point on the cover 11, so that the operator can tell from the exterior with what notch 2, the groove 17, on the rider support arm 14, is in alignment.

When the meter is being carried, as in an airplane, over an area of increasing gravity and the normal limit of movement of the mass 13 is approached the rider may be dropped into a selected notch 2, to thereby move the mass 13 upwardly away from the limit of its movement. The value of the rider, taking into account its moment of force, in gravity units, is then added to subsequent gravity measurements. When the adjusted limit of movement of the mass 13 is again approached, the rider may be moved to an outer notch and again the gravity readings suitably corrected.

In the embodiment shown in Figure 2 instead of employing a sliding carriage, there are employed a plurality of rider support arms 21, each carried by a threaded rod 22 extending upwardly through the top 11 of the meter and operated by a hand wheel 23. Known means are provided to prevent rotation of each rider support arm with the rod on which it is mounted, so that rotation of the latter causes vertical movement of the arm. Each rider support arm is provided with a groove 25 disposed immediately below the leg of the L-shaped rider arm in alignment with one of the notches 2. Each groove carries a rider 18. It will be apparent in this case that whenever it is desired to drop any of the riders into its corresponding notch the corresponding hand wheel 23 is suitably manipulated.

The foregoing illustration and description deals with the case in which the gravity meter is employed in an area of increasing gravity. It will be apparent that exactly the same principle and structure are applicable when the meter is to be adapted for use over long distances where decreasing gravity is encountered. In this case the rider system is arranged on the same side of the pivot point as the gravity responsive mass. In a complete meter, for the fullest possible range of operation, there will be a rider system arranged on either side of the pivot point.

It will be understood that the present invention is applicable to any type of meter employing a moving system with a gravity responsive mass. In the embodiment shown the rider rack is attached to the barometric compensator because this is a convenient point of attachment. If there were no barometric compensator the rider would be arranged to ride on the same rod which carries the barometric compensator which is designated by numeral 24 in the drawing.

The nature and objects of the present invention having been thus described and illustrated, what is claimed as useful and is desired to be secured by Letters Patent is:

1. A gravity meter comprising a moving system responsive to gravity, including a pivotal axis, a rider arm attached to a selected portion of said moving system and provided with at least one notch spaced longitudinally from said pivotal axis, at least one rider support arm pivotally supported adjacent said rider arm and provided with a groove adapted to receive a ring shaped rider and to support said rider in a vertical position, at least one ring shaped rider generally encircling said rider arm and receivable by a rider support arm groove and by a notch on said rider arm, at least one spring means normally urging a rider support arm upwardly toward said rider arm, a casing enclosing the entire system, and means operable from the exterior of said casing to move a selected rider support arm downwardly in opposition to said spring means sufficiently to deposit a rider carried by said support arm into a notch on said rider arm.

2. A gravity meter comprising a moving system responsive to gravity, including a pivotal axis, a rider arm attached to a selected portion of said moving system and provided with at least one notch spaced longitudinally from said pivotal axis, at least one rider support arm supported adjacent said rider arm and provided with a groove adapted to receive a ring shaped rider and to support said rider in a vertical position, at least one ring shaped rider generally encircling said rider arm and receivable by a rider support arm groove and by a notch on said rider arm, a casing enclosing the entire system, and means operable from the exterior of said casing to move a selected rider support arm downwardly to deposit a rider carried by said support arm into a notch on said rider arm and upwardly to lift said rider out of said notch.

3. Gravity meter according to claim 2 in which said rider arm is provided with a plurality of notches spaced longitudinally from said pivotal axis and which includes a plurality of rider support arms each supported adjacent said rider arm with its rider receiving groove in substantial alignment with one of said notches on said rider arm and a plurality of ring shaped riders generally encircling said rider arm.

4. A gravity meter comprising a moving system responsive to gravity, including a pivotal axis, a rider arm attached to a selected portion of said moving system and provided with a plurality of notches spaced longitudinally from said pivotal axis, a slidable carriage arranged adjacent said moving system, a rider support arm pivotally attached to said carriage adjacent said rider arm, and provided with a groove adapted to receive a ring shaped rider and to support said rider in a vertical position, a ring shaped rider generally encircling said rider arm and receivable by said notches and by said groove, spring means normally urging said rider support arm upwardly away from said carriage, a casing enclosing the entire system, means operable from the exterior of said casing to move said carriage so as to position said rider support arm adjacent a selected notch on said rider arm, and means operable from the exterior of said casing to move said rider support arm downwardly in opposition to said spring means sufficiently to deposit said rider in a selected groove on said rider arm.

FRANK G. BOUCHER.

REFERENCES CITED

The following references are of record in the file of this patent:

UNITED STATES PATENTS

| Number | Name | Date |
|---|---|---|
| 2,081,252 | Seederer | May 25, 1937 |
| 2,203,293 | Brown | June 4, 1940 |
| 2,327,697 | Boucher | Aug. 24, 1943 |
| 2,357,356 | Petty | Sept. 5, 1944 |